United States Patent
Okamoto

(10) Patent No.: US 10,116,355 B2
(45) Date of Patent: Oct. 30, 2018

(54) POWER SUPPLY APPARATUS, POWER RECEIVING APPARATUS, AND CONTROL METHOD THEREOF

(71) Applicant: CANON KABUSHIKI KAISHA, Tokyo (JP)

(72) Inventor: Yoshihiko Okamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/433,602

(22) Filed: Feb. 15, 2017

(65) Prior Publication Data

US 2017/0250735 A1 Aug. 31, 2017

(30) Foreign Application Priority Data

Feb. 26, 2016 (JP) ................................. 2016-036314

(51) Int. Cl.
| | | |
|---|---|---|
| *H04B 7/00* | (2006.01) | |
| *H04B 5/00* | (2006.01) | |
| *H04W 12/06* | (2009.01) | |
| *H04W 4/80* | (2018.01) | |

(52) U.S. Cl.
CPC ............ *H04B 5/0037* (2013.01); *H04W 4/80* (2018.02); *H04W 12/06* (2013.01); *H04B 5/0093* (2013.01)

(58) Field of Classification Search
CPC .............................. H04B 5/0037; H04W 4/008
USPC ......................................................... 455/41.2
See application file for complete search history.

(56) References Cited

U.S. PATENT DOCUMENTS

| | | | | |
|---|---|---|---|---|
| 2011/0234156 A1* | 9/2011 | Fujita | .................... | H02J 7/0027 320/108 |
| 2012/0049791 A1* | 3/2012 | Tanabe | .................... | H02J 50/60 320/108 |
| 2012/0212071 A1* | 8/2012 | Miyabayashi | ....... | H04B 5/0037 307/104 |
| 2012/0299389 A1* | 11/2012 | Lee | ..................... | H04B 5/0031 307/104 |
| 2014/0223204 A1* | 8/2014 | Haraguchi | ................ | G06F 1/26 713/300 |
| 2014/0292095 A1* | 10/2014 | Tsukamoto | .......... | H04B 5/0037 307/104 |
| 2014/0317424 A1* | 10/2014 | Akazawa | ............. | H04B 5/0037 713/300 |

(Continued)

FOREIGN PATENT DOCUMENTS

JP 2015-180177 A 10/2015

*Primary Examiner* — Edward Urban
*Assistant Examiner* — Max Mathew
(74) *Attorney, Agent, or Firm* — Cowan, Liebowitz & Latman, P.C.

(57) ABSTRACT

A power supply apparatus comprises a power supply unit which outputs power to a power receiving apparatus in a non-contact manner, a first communication unit which communicates with the power receiving apparatus through a first communication scheme, a second communication unit which communicates with the power receiving apparatus through a second communication scheme, and a control unit which carries out control such that first power is output from the power supply unit, and in the case where first device information and second device information obtained from the power receiving apparatus meet a predetermined condition, a state of connection with the power receiving apparatus is continued by the second communication unit.

11 Claims, 8 Drawing Sheets

(56) References Cited

U.S. PATENT DOCUMENTS

| | | | | |
|---|---|---|---|---|
| 2015/0137614 A1* | 5/2015 | Kang | ................... | H02J 17/00 |
| | | | | 307/104 |
| 2015/0255990 A1* | 9/2015 | Masaoka | ............... | H02J 7/025 |
| | | | | 307/104 |
| 2016/0325632 A1* | 11/2016 | Ichikawa | ............. | B60L 11/005 |
| 2017/0012476 A1* | 1/2017 | Nakase | ................ | H02J 50/12 |
| 2017/0077766 A1* | 3/2017 | Iwasaki | ................ | H02J 50/80 |

\* cited by examiner

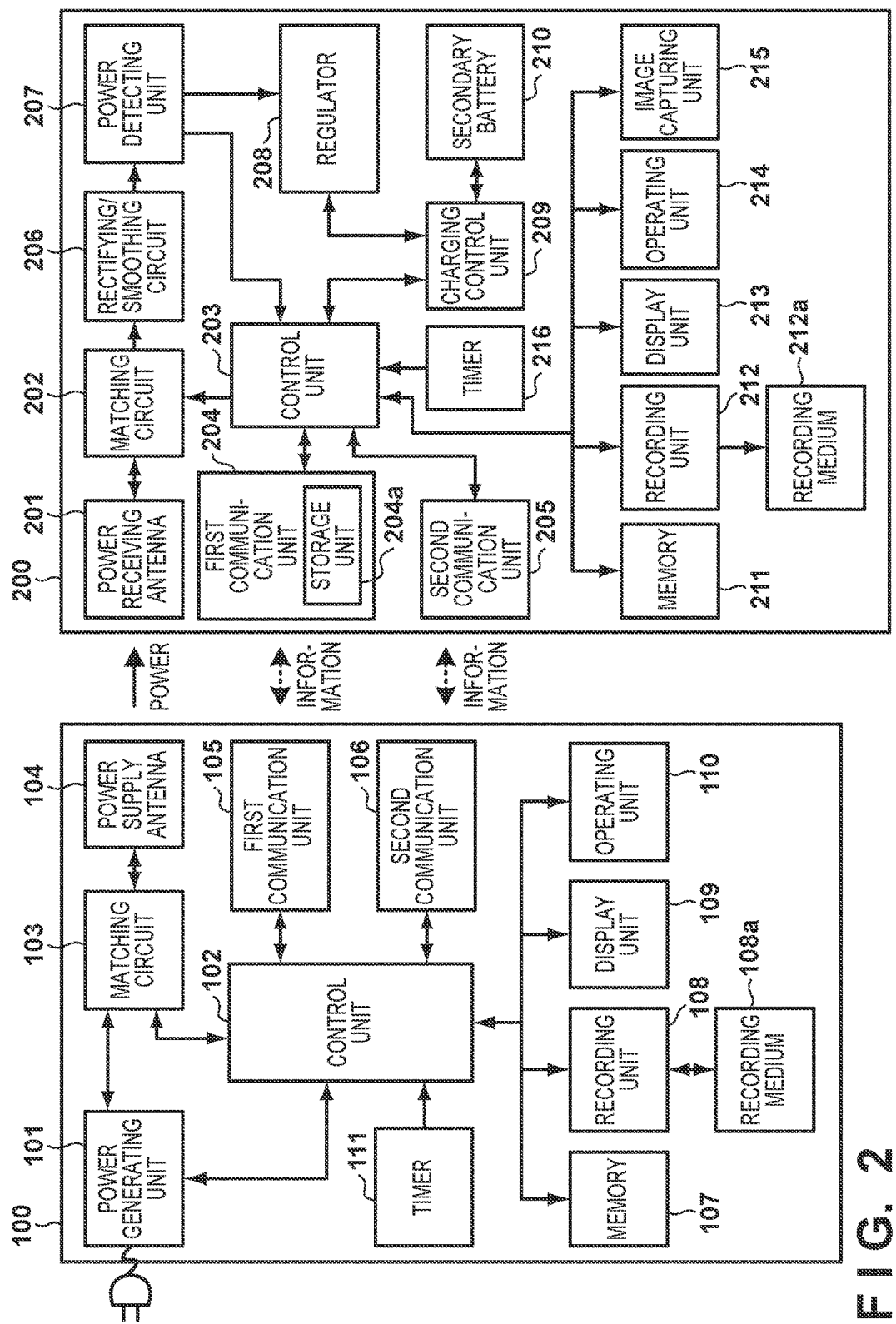
F I G. 2

POWER SUPPLY APPARATUS, POWER RECEIVING APPARATUS, AND CONTROL METHOD THEREOF

BACKGROUND OF THE INVENTION

Field of the Invention

The present invention relates to non-contact power supply systems.

Description of the Related Art

Non-contact power supply systems including a power supply apparatus, having a primary coil for outputting power in a non-contact manner without physically connecting to a connector as an antenna, and a power receiving apparatus, having a secondary coil for receiving power supplied from the power supply apparatus in a non-contact manner as an antenna, are known.

A non-contact power supply system is implemented by the power supply apparatus and the power receiving apparatus exchanging control information pertaining to the power to be supplied/received. Methods have been proposed in which non-contact communication such as NFC is used to exchange the control information. Other methods, in which the exchange is carried out using communication systems having broader communication ranges, have been proposed as well. Rezence (registered trademark), for example, specifies exchanging power supply control information using Bluetooth (registered trademark) Low Energy (BLE). With such a method, however, the broad communication range means that communication may also be carried out with a partner that is not the partner to which power is to be supplied. In this case, the information of the partner to which power is actually to be supplied is not obtained, and thus correct power supply control cannot be carried out, which leads to problems such as overcharging.

To prevent such problems, Japanese Patent Laid-Open No. 2015-180177 proposes a technique for determining whether or not a communication-connected power receiving apparatus is a target for power supply in accordance with a state of communication with the power receiving apparatus when a power supply apparatus changes a power supply state. This makes it possible to confirm whether or not a connection for communication used in power supply control is successfully established with the power receiving apparatus to which the power supply apparatus is to supply power.

However, according to Japanese Patent Laid-Open No. 2015-180177, it is necessary to first carry out a process for supplying power in order to determine whether or not the power receiving apparatus is the target of the power supply. It is therefore possible that the process for supplying power will result in excessive power being supplied, even if only temporarily.

SUMMARY OF THE INVENTION

The present invention has been made in consideration of the aforementioned problems, and realizes a technique for ensuring that communication is not established with a power receiving apparatus that is not a target of power supply before the supply of power to that power receiving apparatus is started.

In order to solve the aforementioned problems, the present invention provides a power supply apparatus which can supply power to a power receiving apparatus in a non-contact manner, the power supply apparatus comprising: a power supply unit configured to output power to the power receiving apparatus in a non-contact manner; a first communication unit configured to communicate with the power receiving apparatus through a first communication scheme; a second communication unit configured to communicate with the power receiving apparatus through a second communication scheme; and a control unit configured to carry out control such that first power is output from the power supply unit, and in the case where first device information obtained from the power receiving apparatus by the first communication unit and second device information obtained from the power receiving apparatus by the second communication unit meet a predetermined condition, a state of connection with the power receiving apparatus is continued by the second communication unit.

In order to solve the aforementioned problems, the present invention provides a power receiving apparatus which can receive power from a power supply apparatus in a non-contact manner, the power receiving apparatus comprising: a power receiving unit configured to receive power from the power supply apparatus in a non-contact manner; a first communication unit configured to communicate with the power supply apparatus through a first communication scheme; a second communication unit configured to communicate with the power supply apparatus through a second communication scheme; a storage unit configured to store device information; and a control unit configured to transmit the device information to the power supply apparatus using the first communication unit in the case where a request for the device information has been received from the power supply apparatus, and transmit information for connecting to the power supply apparatus using the second communication unit in the case where predetermined power has been received from the power supply apparatus through the first communication unit.

In order to solve the aforementioned problems, the present invention provides a control method of a power supply apparatus which has a power supply unit that outputs power to a power receiving apparatus in a non-contact manner, a first communication unit that communicates with the power receiving apparatus through a first communication scheme, and a second communication unit that communicates with the power receiving apparatus through a second communication scheme, the method comprising: outputting first power from the power supply unit, and comparing first device information obtained from the power receiving apparatus by the first communication unit with second device information obtained from the power receiving apparatus by the second communication unit; and carrying out control so that a state of connection with the power receiving apparatus is continued by the second communication unit in the case where the first device information and the second device information meet a predetermined condition.

In order to solve the aforementioned problems, the present invention provides a control method of a power receiving apparatus which has a power receiving unit that receives power from a power supply apparatus in a non-contact manner, a first communication unit that communicates with the power supply apparatus through a first communication scheme, a second communication unit that communicates with the power supply apparatus through a second communication scheme, and a storage unit that stores device information, the method comprising: transmitting the device information to the power supply apparatus using the first communication unit in the case where a request for the device information has been received from the power supply apparatus; and transmitting information for connecting to the power supply apparatus using the second communication unit in the case where predetermined power has been received from the power supply apparatus through the first communication unit.

In order to solve the aforementioned problems, the present invention provides a non-transitory computer-readable storage medium storing a program for causing a computer to execute a control method of a power supply apparatus which has a power supply unit that outputs power to a power receiving apparatus in a non-contact manner, a first communication unit that communicates with the power receiving apparatus through a first communication scheme, and a second communication unit that communicates with the power receiving apparatus through a second communication scheme, the method comprising: outputting first power from the power supply unit, and comparing first device information obtained from the power receiving apparatus by the first communication unit with second device information obtained from the power receiving apparatus by the second communication unit; and carrying out control so that a state of connection with the power receiving apparatus is continued by the second communication unit in the case where the first device information and the second device information meet a predetermined condition.

In order to solve the aforementioned problems, the present invention provides a non-transitory computer-readable storage medium storing a program for causing a computer to execute a control method of a power receiving apparatus which has a power receiving unit that receives power from a power supply apparatus in a non-contact manner, a first communication unit that communicates with the power supply apparatus through a first communication scheme, a second communication unit that communicates with the power supply apparatus through a second communication scheme, and a storage unit that stores device information, the method comprising: transmitting the device information to the power supply apparatus using the first communication unit in the case where a request for the device information has been received from the power supply apparatus; and transmitting information for connecting to the power supply apparatus using the second communication unit in the case where predetermined power has been received from the power supply apparatus through the first communication unit.

According to the present invention, the likelihood that communication will be established with a power receiving apparatus that is not a target of power supply before the supply of power to that power receiving apparatus is started can be reduced.

Further features of the present invention will become apparent from the following description of exemplary embodiments (with reference to the attached drawings).

BRIEF DESCRIPTION OF THE DRAWINGS

FIG. 2 is a block diagram illustrating the configuration of a power supply apparatus and a power receiving apparatus according to embodiments of the invention.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

A non-contact power supply system constituted of a power supply apparatus and a power receiving apparatus according to embodiments of the invention will be described hereinafter.

System Configuration

Figure 1:
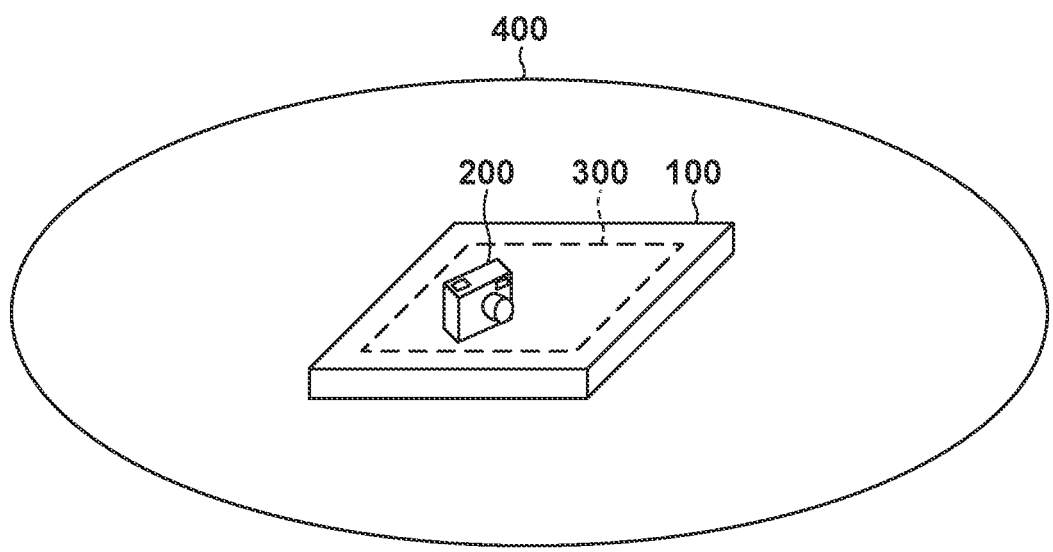
FIG. 1 is a schematic diagram illustrating a non-contact power supply system according to embodiments of the invention.

First, the configuration of the non-contact power supply system according to the present embodiment will be described with reference to FIG. 1.

The system according to the present embodiment includes a power supply apparatus 100 and a power receiving apparatus 200 that communicates with and is supplied with power from the power supply apparatus 100.

In the case where the power receiving apparatus 200 is present within a predetermined range 300 of the power supply apparatus 100, the power supply apparatus 100 carries out non-contact communication via a first communication unit 105 and receives device information from the power receiving apparatus 200.

Additionally, in the case where the power receiving apparatus 200 is present within a predetermined range 400 of the power supply apparatus 100, the power supply apparatus 100 carries out non-contact communication via a second communication unit 106 and receives a connection signal including device information from the power receiving apparatus 200.

Upon determining that the power receiving apparatus 200 is a device to which power can be supplied, the power supply apparatus 100 outputs the power to be supplied via a power supply antenna 104, thus supplying power to the power receiving apparatus 200. At this time, the power supply apparatus 100 can confirm the state of the power receiving apparatus 200 by receiving power reception information from the power receiving apparatus 200 via the second communication unit 106.

The power receiving apparatus 200, which has a power receiving antenna 201, can receive power output from the power supply apparatus 100 in a non-contact manner via the power receiving antenna 201. The power receiving apparatus 200 cannot receive power from the power supply apparatus 100 in the case where the power receiving apparatus 200 is not present within the predetermined range 300 of the power supply apparatus 100. The power receiving apparatus 200 can also transmit the power reception information to the power supply apparatus 100 via a second communication unit 205 while power is being received.

In the case where the power receiving apparatus 200 is present within the predetermined range 300 of the power supply apparatus 100, the power receiving apparatus 200 can communicate with the power supply apparatus 100 via a first communication unit 204. Likewise, in the case where the power receiving apparatus 200 is present within the predetermined range 400 of the power supply apparatus 100, the power receiving apparatus 200 can communicate with the power supply apparatus 100 via the second communication unit 205.

The descriptions of the present embodiment assume that the predetermined range 400 of the power supply apparatus 100 is broader than the predetermined range 300 of the power supply apparatus 100. In other words, the second communication unit 106 has a broader communication range than the first communication unit 105.

Note also that it is assumed that the power supply apparatus 100 may be capable of supplying power in a non-contact manner to a plurality of electronic devices simultaneously.

The power receiving apparatus 200 may be any electronic device operating under power supplied from a secondary battery 210, such as a tablet PC, a smartphone, an image capturing apparatus such as a digital still camera or a digital video camera, or a playback apparatus that plays back audio data or video data. The power receiving apparatus 200 may also be a mobile apparatus such as a vehicle that operates under power supplied from the secondary battery 210.

Meanwhile, in the case where the power receiving apparatus 200 does not include the secondary battery 210, it is assumed that the power receiving apparatus may be an electronic device capable of operating under power supplied from the power supply apparatus 100.

Apparatus Configuration

Next, the configurations and functions of the power supply apparatus 100 and the power receiving apparatus 200 in the non-contact power supply system according to the present embodiment will be described with reference to FIG. 2.

The power supply apparatus 100 will be described first.

The power supply apparatus 100 includes a power generating unit 101, a control unit 102, a matching circuit 103, the power supply antenna 104, the first communication unit 105, the second communication unit 106, a memory 107, a recording unit 108, a display unit 109, an operating unit 110, and a timer 111. Furthermore, the recording unit 108 includes a recording medium 108a.

The power generating unit 101 transforms AC power supplied from an AC power source into DC power, and supplies the resulting DC power to the various units of the power supply apparatus 100. The power generating unit 101 also generates power to be supplied to the power receiving apparatus 200 via the power supply antenna 104. At this time, the power is supplied to the power receiving apparatus 200 in accordance with a predetermined protocol used by non-contact power supply systems.

The power generated by the power generating unit 101 includes first power, second power, and third power. The first power is power required for the power supply apparatus 100 to activate the second communication unit 205 of the power receiving apparatus 200. The second power is power output when the power supply apparatus 100 supplies power to the power receiving apparatus 200. The third power is power output in order for the power supply apparatus 100 to detect whether or not the power receiving apparatus 200 is present within the predetermined range 300 of the power supply apparatus 100. It is assumed that the first power is a lower power than the second power, and that the third power is a lower amount of power than the first power.

The control unit 102 includes a CPU, for example, and controls the various units of the power supply apparatus 100 using power supplied from the power generating unit 101. Additionally, the control unit 102 controls operations of the various units of the power supply apparatus 100 by executing computer programs stored in the memory 107.

The matching circuit 103 is constituted of a matching adjustment element such as a variable capacitor, a capacitor, a variable coil, a coil, a variable resistor, or a resistor. The matching circuit 103 may also have a switch for switching among a plurality of matching adjustment elements.

Additionally, the matching circuit 103 includes a resonance circuit for achieving resonance between the power supply antenna 104 and a power receiving antenna included in a device selected as a target for power supply by the control unit 102, the resonance circuit being a circuit for achieving impedance matching between the power generating unit 101 and the power supply antenna 104. The impedance of the matching circuit 103 changes in the case where the power receiving apparatus 200 is present within the predetermined range 300 of the power supply apparatus 100. The control unit 102 can detect the presence of the power receiving apparatus 200 by detecting the change in the impedance of the matching circuit 103.

A resonant frequency is a frequency at which the power supply apparatus 100 and the device to which power is supplied by the power supply apparatus 100 resonate, and will be called a "resonant frequency f" hereinafter.

The following Formula 1 expresses the resonant frequency f. Here, L represents an inductance value produced by parasitic factors between the power supply antenna 104 and the exterior, whereas C represents a capacitance value produced by parasitic factors with the matching circuit.

$$f = 1/\{2\pi\sqrt{(LC)}\} \qquad (1)$$

Note that the control unit 102 sets the power output from the power supply antenna 104 to the resonant frequency f by controlling the value of a variable capacitor or the like within the matching circuit 103. The resonant frequency f is 6.78 MHz, for example.

The power supply antenna 104 is an antenna for outputting the power generated by the power generating unit 101 to the exterior. The power supply apparatus 100 supplies power to the power receiving apparatus 200 via the power supply antenna 104.

The first communication unit 105 carries out wireless communication on the basis of an NFC specification defined by the NFC Forum, for example. The first communication unit 105 may carry out wireless communication on the basis of the ISO/IEC 18092 standard, the ISO/IEC 14443 standard, or the ISO/IEC 21481 standard instead.

The information exchanged between the first communication unit 105 and the power receiving apparatus 200 is information compliant with the NFC Data Exchange Format (NDEF).

The first communication unit 105 switches an analog multiplier, a load resistance, and so on included in the first communication unit 105 and changes the amplitude of the power generated by the power generating unit 101 into a pulse signal. The pulse signal produced by the first communication unit 105 as a result is supplied to a communication antenna included in the first communication unit 105 and then transmitted to the power receiving apparatus 200 as a command. The first communication unit 105 also has an encoding circuit using a predetermined encoding format.

In the case where NDEF-compliant information is received from the power receiving apparatus 200, the first communication unit 105 can use the encoding circuit to demodulate a response, received from the power receiving apparatus 200, to the command transmitted to the power receiving apparatus 200, in accordance with a change in a current flowing in the communication antenna. Through this, the first communication unit 105 can receive, from the power receiving apparatus 200, a response to a request transmitted to the power receiving apparatus 200, information transmitted from the power receiving apparatus 200, and so on through load modulation. The first communication unit 105 transmits, to the power receiving apparatus 200, a command in response to an instruction from the control unit 102. Furthermore, in the case where a response, information, or the like has been received from the power receiving apparatus 200, the first communication unit 105 demodulates the received response and supplies the response to the control unit 102.

The communication antenna is an antenna for communicating with the power receiving apparatus 200 according to the communication scheme used by the first communication unit 105. The communication antenna is a loop antenna, for example. The power supply apparatus 100 transmits information to the power receiving apparatus 200 via the communication antenna. Additionally, the power supply apparatus 100 receives a response to information transmitted to the power receiving apparatus 200, information transmitted from the power receiving apparatus 200, and so on via the communication antenna. Specifically, communication is carried out according to an electromagnetic induction technique, in which a magnetic field is produced by a current flowing in a loop pattern of the communication antenna, and an induced current flows in the opposing power receiving antenna 201 provided in the power receiving apparatus 200 through the magnetic field that has been produced.

The first communication unit 105 may further include a switch (not illustrated) for putting the communication antenna into an open state. The control unit 102 can change the connection state of the communication antenna by controlling the switch. The communication antenna is connected while the control unit 102 has the switch on, whereas the communication antenna enters the open state when the switch is turned off.

The second communication unit 106 carries out wireless communication with the power receiving apparatus 200 using a different communication standard than the communication standard used by the first communication unit 105. The communication standard used by the second communication unit 106 is Bluetooth Low Energy (BLE), defined by the Bluetooth standard, for example. The second communication unit 106 transmits information pertaining to the supply of power, such as a power class of the power supply, a level of power that can be supplied, or the starting/stopping of the supply of power, to the power receiving apparatus 200.

The memory 107 stores computer programs for controlling operations of the various units of the power supply apparatus 100 and information such as parameters pertaining to the operations of the respective units. The memory 107 also stores information required by the control unit 102 to adjust the matching circuit 103, as well as image information, audio information, and so on to be supplied to the display unit 109. The memory 107 further stores identification information of the power supply apparatus 100, power supply parameters and flags and the like for controlling the supply of power, and information received from the power receiving apparatus 200 via the first communication unit 105 and the second communication unit 106.

The recording unit 108 records information received via the first communication unit 105 and the second communication unit 106 into the recording medium 108a. The recording unit 108 can also read out information such as image information and audio information from the recording medium 108a and supply that information to the display unit 109.

Note that the recording medium 108a may be a hard disk, a memory card, or the like, and furthermore may be a recording medium that is fixed within the power supply apparatus 100 or an external recording medium that can be removed from the power supply apparatus 100.

The display unit 109 displays image information read out from the recording medium 108a by the recording unit 108, and image information selected by the control unit 102 from image information supplied from the memory 107. "Image information" refers to messages and the like for notifying the user of communication conditions, power supply conditions, and the like with the power receiving apparatus 200.

The display unit 109 may also be configured as a High-Definition Multimedia Interface (HDMI) (registered trademark) connector or the like for connecting to an external monitor.

The operating unit 110 provides a user interface for operating the power supply apparatus 100. The operating unit 110 includes a power button for operating the power supply apparatus 100, a mode switching button for switching among operation modes of the power supply apparatus 100, a settings change button for changing settings of the power supply apparatus 100, and the like, and the buttons are constituted of switches, a touch panel, or the like. The control unit 102 controls the power supply apparatus 100 in accordance with user instructions input through the operating unit 110. Note that the operating unit 110 may be a unit that controls the power supply apparatus 100 in accordance with remote control signals received from a remote controller (not illustrated).

The timer 111 measures the current time, times pertaining to operations and processes carried out by the various units, and so on. Additionally, threshold values for the times measured by the timer 111 are stored in advance in the memory 107.

The power supply apparatus 100 may further include a speaker unit (not illustrated). The speaker unit (not illustrated) outputs audio information read out from the recording medium 108a by the recording unit 108, or audio information supplied from the memory 107.

Additionally, the power supply apparatus 100 may further include a temperature detecting unit (not illustrated). The temperature detecting unit (not illustrated) is disposed near the control unit 102, the matching circuit 103, or the power supply antenna 104, for example. The control unit 102 can detect temperature information of the power supply apparatus 100 using the temperature detecting unit (not illustrated).

The power receiving apparatus 200 will be described next.

The present embodiment describes a digital still camera as an example of the power receiving apparatus 200.

The power receiving apparatus 200 includes the power receiving antenna 201, a matching circuit 202, a control unit 203, the first communication unit 204, the second communication unit 205, a rectifying/smoothing circuit 206, a power detecting unit 207, a regulator 208, a charging control unit 209, the secondary battery 210, a memory 211, a recording unit 212, a display unit 213, an operating unit 214, an image capturing unit 215, and a timer 216. Furthermore, the first communication unit 204 includes a storage unit 204a, and the recording unit 212 includes a recording medium 212a.

The power receiving antenna 201 is an antenna for receiving the power supplied from the power supply apparatus 100. The power received from the power supply apparatus 100 via the power receiving antenna 201 is supplied to the rectifying/smoothing circuit 206 via the matching circuit 202.

The matching circuit 202 is a circuit for achieving impedance matching between the power receiving antenna 201 and the rectifying/smoothing circuit 206. The matching circuit 202 is also a resonance circuit for causing the power receiving antenna 201 to resonate at the same frequency as the resonant frequency f of the power supply apparatus 100. Like the matching circuit 103, the matching circuit 202 is constituted of a matching adjustment element such as a variable capacitor, a capacitor, a variable coil, a coil, a variable resistor, or a resistor. By controlling the matching circuit 202, the control unit 203 changes a capacitance value of the variable capacitor or the like so that the power receiving antenna 201 resonates at the same frequency as the resonant frequency f of the power supply apparatus 100.

The control unit 203 controls operations of the various units of the power receiving apparatus 200 by executing computer programs stored in the memory 211.

The first communication unit 204 communicates with the power supply apparatus 100 using the same communication standard as the first communication unit 105 of the power supply apparatus 100. Additionally, the first communication unit 204 includes the storage unit 204a. Authentication information used to carry out an authentication process with the power supply apparatus 100 for the purpose of the non-contact power supply is stored in the storage unit 204a. The authentication information includes at least information pertaining to the non-contact power supply systems with which the power receiving apparatus 200 is compliant and information pertaining to the device that corresponds to the power receiving apparatus 200.

The second communication unit 205 communicates with the power supply apparatus 100 using the same communication standard as the second communication unit 106. The second communication unit 205 can transmit, to the power supply apparatus 100, device information of the power receiving apparatus 200, information indicating compliant non-contact power supply systems, information pertaining to charging such as voltages/currents of the secondary battery 210, and so on.

The rectifying/smoothing circuit 206 generates DC power from the power received by the power receiving antenna 201. Furthermore, the rectifying/smoothing circuit 206 supplies the generated DC power to the regulator 208 via the power detecting unit 207. Note that the rectifying/smoothing circuit 206 includes a rectifying diode, and generates the DC power through full-wave rectification or half-wave rectification. Additionally, the control unit 203 can detect a voltage value and a current value of the rectifying/smoothing circuit 206.

The power detecting unit 207 detects the power received via the power receiving antenna 201, and supplies information indicating the detected power to the control unit 203.

The regulator 208 carries out control such that a voltage of the DC power supplied from the rectifying/smoothing circuit 206 and a voltage of power supplied from the secondary battery 210 take on a voltage value set by the control unit 203. Note that the regulator 208 may be a switching regulator or a linear regulator.

In the case where power is supplied from the regulator 208, the charging control unit 209 charges the secondary battery 210 in accordance with the supplied power. Additionally, the charging control unit 209 periodically detects information pertaining to the charging of the attached secondary battery 210 and supplies that information to the control unit 203. This information is a voltage value, a current value, or the like of the secondary battery 210, for example.

The secondary battery 210 is a secondary battery fixed within the power receiving apparatus 200 or a removable secondary battery. The secondary battery 210 is a chargeable battery, and is thus a lithium-ion battery or the like, for example. The secondary battery 210 can supply power to the various units of the power receiving apparatus 200.

The memory 211 stores computer programs for controlling operations of the various units of the power receiving apparatus 200, information such as parameters pertaining to the operations of the respective units, and so on. The memory 211 also stores image information, audio information, and so on to be supplied to the display unit 213.

The recording unit 212 records information such as image data, audio information, and so on supplied from the image capturing unit 215 into the recording medium 212a. The recording unit 212 can also read out information such as image information and audio information from the recording medium 212a and supply that information to the display unit 213.

Note that the recording medium 212a may be a hard disk, a memory card, or the like, and furthermore may be a recording medium that is fixed within the power receiving apparatus 200 or an external recording medium that can be removed from the power receiving apparatus 200.

The display unit 213 displays image information read out from the recording medium 212a by the recording unit 212, image information supplied from the memory 211, and so on. "Image information" refers to messages and the like for notifying a user of error information or the like of the power receiving apparatus 200. The display unit 213 can also display icons, menu screens, and the like stored in the memory 211 in advance.

The operating unit 214 provides a user interface for operating the power receiving apparatus 200. The operating unit 214 includes a power button for operating the power receiving apparatus 200 and a mode switching button for switching among operation modes of the power receiving apparatus 200, and the buttons are constituted of switches, a touch panel, or the like. The control unit 203 controls the power receiving apparatus 200 in accordance with user instructions input through the operating unit 214. Note that the operating unit 214 may be a unit that controls the power receiving apparatus 200 in accordance with remote control signals received from a remote controller (not illustrated).

The image capturing unit 215 includes an image sensor for generating image data from light from a subject, an image processing circuit for carrying out image processing on the image data generated by the image sensor, a compression/decompression circuit for compressing the image data and decompressing compressed image data, and so on. The image capturing unit 215 shoots an image of a subject and supplies image data such as a still image, a video, or the like obtained as a result of the shooting to the recording unit 212. Note that the image capturing unit 215 may further include constituent elements required for shooting a subject.

The timer 216 measures the current time, times pertaining to operations and processes carried out by the various units, and so on. Additionally, threshold values for the times measured by the timer 216 are stored in advance in the memory 211.

Additionally, the power receiving apparatus 200 may further include a temperature detecting unit (not illustrated). The temperature detecting unit (not illustrated) is disposed near the power receiving antenna 201, the matching circuit 202, the control unit 203, or the secondary battery 210, for example. The control unit 203 can detect temperature information of the power receiving apparatus 200 using the temperature detecting unit (not illustrated).

Communication Sequence

Next, a conventional communication sequence that can be applied in the non-contact power supply system according to the present embodiment will be described with reference to FIG. 3. Note that the following will describe a non-contact power supply system based on the Alliance for Wireless Power (A4WP) standard as an example.

In S301, the control unit 102 outputs the third power through the power supply antenna 104 for a predetermined time interval. The "third power" refers to a Short Beacon signal. The Short Beacon signal is transmitted within the predetermined range 300 of the power supply apparatus 100. By periodically transmitting the Short Beacon signal through the power supply antenna 104, the control unit 102 detects a change in the impedance of the matching circuit 103. In the case where a change in the impedance of the matching circuit 103 is detected when the Short Beacon signal is transmitted, the control unit 102 detects that an object affecting the impedance, such as the power receiving apparatus 200 or a metal object, is present within the predetermined range 300 of the power supply apparatus 100.

In the case where a change in the impedance of the matching circuit 103 has been detected in S301, in S302, the control unit 102 outputs the first power through the power supply antenna 104 after the change in the impedance has been detected. The "first power" refers to a Long Beacon signal, and the Long Beacon signal is transmitted within the predetermined range 300 of the power supply apparatus 100. The control unit 102 can transmit the Long Beacon signal in a predetermined time interval.

In the case where the Long Beacon signal has been received via the power receiving antenna 201, the control unit 203 activates the second communication unit 205 using the received power.

In S303, the control unit 203 transmits an Advertisement signal to the power supply apparatus 100 via the second communication unit 205. The Advertisement signal includes device information such as a name of the power receiving apparatus 200 for identifying the device that is the power receiving apparatus 200, information indicating the manufacturer of the power receiving apparatus 200, and so on, information indicating compliant non-contact power supply systems, and so on. The Advertisement signal is transmitted within the predetermined range 400 of the power supply apparatus 100.

In the case where the Advertisement signal has been received from the power receiving apparatus 200 in S303, in S304, the control unit 102 transmits a connection request signal to the power receiving apparatus 200 via the second communication unit 106, in response to which the second communication unit 106 and the second communication unit 205 establish a communication connection through BLE.

After the communication connection using BLE, the control unit 102 receives static power reception information of the power receiving apparatus 200 from the power receiving apparatus 200 via the second communication unit 106. The static power reception information is information such as, for example, revision information of the protocol employed by the non-contact power supply system, hardware revision information/software revision information of the power receiving apparatus 200, maximum power reception capability information, and so on.

After the static power reception information has been received, the control unit 102 transmits static power transmission information of the power supply apparatus 100 to the power receiving apparatus 200 via the second communication unit 106. The static power transmission information is, for example, output information of the power supply apparatus 100, class information corresponding to the power supply apparatus 100, and so on.

After the static power transmission information has been transmitted, the control unit 102 receives dynamic power reception information of the power receiving apparatus 200 from the power receiving apparatus 200 via the second communication unit 106. The dynamic power reception information is, for example, voltage/current information of the rectifying/smoothing circuit 206, voltage/current information of the secondary battery 210, warning information of the power receiving apparatus 200, and so on. In the case where the warning information of the power receiving apparatus 200 is included in the dynamic power reception information, that information indicates that some sort of error has occurred in the power receiving apparatus 200. The processing described up until now is carried out in S304.

Next, in S305, the control unit 102 transmits control parameters of the power receiving apparatus 200 via the second communication unit 106. The control parameters are, for example, parameters indicating whether or not the power receiving apparatus 200 can be charged. After the control parameters have been transmitted, the control unit 102 outputs the second power through the power supply antenna 104 on the basis of the static power reception information of the power receiving apparatus 200 received in S304.

In S306, the control unit 203 transmits the dynamic power reception information to the power supply apparatus 100 via the second communication unit 205 while the second power is being received via the power receiving antenna 201. The power supply apparatus 100 can detect a charging state of the power receiving apparatus 200 from the received dynamic power reception information.

The process for supplying power from the power supply apparatus 100 to the power receiving apparatus 200 is executed through the communication sequence described above. Incidentally, in the above-described communication sequence, it is not determined whether or not the partner charged in S306 is the power receiving apparatus that transmitted the Advertisement signal in S303. As such, the following problem arises in the case where, for example, a different power supply apparatus and a different power receiving apparatus that are nearby attempt to execute the communication sequence at the timing of S303 in the above-described communication sequence. In the case where the Advertisement signal is also emitted from the other power receiving apparatus at the timing of S303, the Advertisement signal from that other power receiving apparatus may be received first. In this case, the partner from which the power reception information is received will be different from the partner to be charged, and thus the power supply apparatus may overcharge the power receiving apparatus. A first embodiment for solving this problem will be described next.

First Embodiment

In the first embodiment, the transmission of the Short Beacon in the conventional communication sequence is omitted, and the power supply apparatus 100 detects the power receiving apparatus 200 through short-range wireless communication (NFC) polling.

Power Supply Apparatus Operations

A control process carried out by the power supply apparatus 100 according to the first embodiment will be described next with reference to the flowchart in FIG. 4. Note that this flowchart is realized by the control unit 102 executing computer programs stored in the memory 107. The same applies for FIGS. 6A and 6B, which will be described later.

In S401, the control unit 102 controls the first communication unit 105 so as to transmit a device information request signal to the power receiving apparatus 200 present within the predetermined range 300 of the power supply apparatus 100. This may be, for example, a polling operation in which Type A, Type B, and Type F request commands according to the NFC communication standard are repeatedly transmitted in order.

In S402, the control unit 102 determines whether or not a response signal, transmitted from the power receiving apparatus 200 in response to the device information request signal transmitted in S401, has been received via the first communication unit 105. In the case where the response signal from the power receiving apparatus 200 has been received via the first communication unit 105 (YES in S402), the control unit 102 advances the process to S403. However, in the case where the response signal from the power receiving apparatus 200 has not been received (NO in S402), the control unit 102 returns the process to S401.

In S403, the control unit 102 controls the power generating unit 101 to output the first power, transmits the Long Beacon signal within the predetermined range 300 of the power supply apparatus 100 via the power supply antenna 104, and advances the process to S404.

In S404, the control unit 102 determines whether or not the Advertisement signal from the power receiving apparatus 200 present within the predetermined range 400 of the power supply apparatus 100 has been received via the second communication unit 106. In the case where the Advertisement signal has been received via the second communication unit 106 (YES in S404), the control unit 102 advances the process to S405. In the case where the Advertisement signal has not been received via the second communication unit 106 (NO in S404), the control unit 102 advances the process to S415.

In S405, the control unit 102 controls the power generating unit 101 to stop the output of the first power, and advances the process to S406.

In S406, the control unit 102 compares the device information of the power receiving apparatus 200 received via the first communication unit 105 in S402 with the device information of the power receiving apparatus received via the second communication unit 106 in S404, and advances the process to S407.

In S407, in the case where the two pieces of device information compared in S406 indicate the same power receiving apparatus 200 (YES in S407), the control unit 102 advances the process to S408. Meanwhile, in the case where the two pieces of device information compared in S406 indicate different power receiving apparatuses (NO in S407), the control unit 102 advances the process to S416.

In S408, the control unit 102 determines that the power receiving apparatus 200 present within the predetermined range 300 of the power supply apparatus 100 and the power receiving apparatus present within the predetermined range 400 of the power supply apparatus 100 are the same power receiving apparatus 200, and advances the process to S409.

In S409, the control unit 102 carries out a communication connection process between the second communication unit 106 and the second communication unit 205, in the same manner as the process of S304. Upon the power supply apparatus 100 and the power receiving apparatus 200 connecting through a communication standard with which the second communication unit 106 is compliant, the control unit 102 advances the process to S410.

In S410, the control unit 102 controls the power generating unit 101 to output the second power, in the same manner as the process of S305, and begins the process for supplying power to the power receiving apparatus 200 via the power supply antenna 104. Additionally, the control unit 102 receives the dynamic power reception information from the power receiving apparatus 200 via the second communication unit 106 while the power supply process is being executed, in the same manner as the process of S306. After the power supply process has been executed, the control unit 102 advances the process to S411.

In S411, in the case where the Advertisement signal has been received from a power receiving apparatus aside from the power receiving apparatus 200 (YES in S411), the control unit 102 advances the process to S414. Meanwhile, in the case where the Advertisement signal has not been received from a power receiving apparatus aside from the power receiving apparatus 200 (NO in S411), the control unit 102 advances the process to S412.

In S412, the control unit 102 determines whether or not the dynamic power reception information received via the second communication unit 106 includes error information indicating overvoltage, overcurrent, an abnormal rise in temperature, or the like. In the case where the dynamic power reception information received via the second communication unit 106 includes the error information (YES in S412), the control unit 102 advances the process to S414. Meanwhile, in the case where the dynamic power reception information received via the second communication unit 106 does not include the error information (NO in S412), the control unit 102 advances the process to S413.

In S413, the control unit 102 determines whether or not the dynamic power reception information received via the second communication unit 106 includes information indicating that charging is complete. In the case where the dynamic power reception information received via the second communication unit 106 includes the information indicating that charging is complete (YES in S413), the control unit 102 advances the process to S414. Meanwhile, in the case where the dynamic power reception information received via the second communication unit 106 does not include the information indicating that charging is complete (NO in S413), the control unit 102 returns the process to S411.

In S414, the control unit 102 controls the power generating unit 101 to stop the output of the second power, stops the process of supplying power to the power receiving apparatus 200, and ends the process.

In S415, the control unit 102 determines that a power receiving apparatus 200 compliant with the non-contact power supply system with which the power supply apparatus 100 is compliant is not present within the predetermined range 300 of the power supply apparatus 100, and ends the process. At this time, the control unit 102 may cause a message indicating that a device that cannot be charged has been placed on the power supply apparatus 100 to be displayed in the display unit 109.

In S416, the control unit 102 determines that the power receiving apparatus present within the predetermined range 300 of the power supply apparatus 100 and the power receiving apparatus present within the predetermined range 400 of the power supply apparatus 100 are different power receiving apparatuses, and ends the process.

Note that the control unit 102 may stop the polling operation carried out by the first communication unit 105 after the process of S402, or may continue to execute the polling operation. Furthermore, the control unit 102 may carry out control such that the operations performed by the first communication unit 105 are stopped before the process of S410, and may control the switch such that the communication antenna within the first communication unit 105 is put into an open state.

According to the above-described process, the power supply process is started after determining whether or not the power receiving apparatus present within the predetermined range 400 of the power supply apparatus 100, in which the second communication unit 106 is capable of communication, and the power receiving apparatus present within the predetermined range 300 of the power supply apparatus 100, in which the power supply apparatus 100 can supply power, are the same power receiving apparatus. As a result, even in the case where a plurality of power receiving apparatuses are present within the predetermined range 400 of the power supply apparatus 100, the power receiving apparatus with which the power supply process is to be executed can be connected with the second communication unit 106, which makes it possible to prevent the execution of the process for supplying power to an unintended power receiving apparatus.

Meanwhile, even in the case where a plurality of power supply apparatuses 100 are located near each other, it is possible to connect to the power receiving apparatus present within the predetermined range 300 of the power supply apparatus 100 via the second communication unit 106, which makes it possible to prevent the mistaken execution of the process for supplying power to a power receiving apparatus not present within the predetermined range 300 of the power supply apparatus 100.

Power Receiving Apparatus Operations

A control process carried out by the power receiving apparatus 200 according to the first embodiment will be described next with reference to the flowchart in FIG. 5. Note that this process is a process corresponding to the process carried out by the power supply apparatus 100 as illustrated in FIG. 4. This flowchart is realized by the control unit 203 executing computer programs stored in the memory 211. The same applies for FIG. 7, which will be described later.

In S501, the control unit 203 determines whether or not the device information request signal transmitted from the power supply apparatus 100 has been received via the first communication unit 204. In the case where the device information request signal transmitted from the power supply apparatus 100 has been received via the first communication unit 204 (YES in S501), the control unit 203 advances the process to S502. Meanwhile, in the case where the device information request signal transmitted from the power supply apparatus 100 has not been received via the first communication unit 204 (NO in S501), the control unit 203 continues to stand by until the reception of the device information request signal from the power supply apparatus 100 is detected.

In S502, the control unit 203 transmits the response signal, including the device information of the power receiving apparatus 200 stored in the storage unit 204a, to the power supply apparatus 100 via the first communication unit 204, and advances the process to S503.

In S503, the control unit 203 receives the Long Beacon signal transmitted from the power supply apparatus 100 via the power receiving antenna 201 and advances the process to S504.

In S504, the control unit 203 determines whether or not the second communication unit 205 can be activated using the power of the Long Beacon signal received in S503. In the case where the second communication unit 205 can be activated using the power of the received Long Beacon signal (YES in S504), the control unit 203 advances the process to S505. Meanwhile, in the case where the second communication unit 205 cannot be activated using the power of the received Long Beacon signal (NO in S504), the control unit 203 ends the process. At this time, it is thought that an amount of power sufficient to activate the second communication unit 205 has not been received, and thus the control unit 203 may cause a message prompting the user to change the position of the power receiving apparatus 200 to be displayed in the display unit 213.

In S505, the control unit 203 transmits the Advertisement signal within the predetermined range 400 of the power supply apparatus 100 via the second communication unit 205, and advances the process to S506.

In S506, the control unit 203 determines whether or not the connection request signal transmitted from the power supply apparatus 100 has been received via the second communication unit 205. In the case where the connection request signal transmitted from the power supply apparatus 100 has been received via the second communication unit 205 (YES in S506), the control unit 203 advances the process to S507. Meanwhile, in the case where the connection request signal transmitted from the power supply apparatus 100 has not been received via the second communication unit 205 (NO in S506), the control unit 203 ends the process.

In S507, the control unit 203 carries out a communication connection process between the second communication unit 205 and the second communication unit 106 of the power supply apparatus 100, in the same manner as the process of S304. After the power supply apparatus 100 and the power receiving apparatus 200 are connected using the communication standard with which the second communication unit 205 is compliant, the control unit 203 transmits the static power reception information of the power receiving apparatus 200 to the power supply apparatus 100 via the second communication unit 205. After the static power reception information has been transmitted, the control unit 203 receives the static power transmission information of the power supply apparatus 100 from the power supply apparatus 100 via the second communication unit 205. After the static power transmission information has been received, the control unit 203 transmits the dynamic power reception information of the power receiving apparatus 200 to the power supply apparatus 100 via the second communication unit 205, and advances the process to S508.

In S508, the control unit 203 receives the control parameters of the power receiving apparatus 200 from the power supply apparatus 100 via the second communication unit 205, in the same manner as the process of S305. After the control parameters have been received, the control unit 203 receives the second power from the power supply apparatus 100. The control unit 203 also transmits the dynamic power reception information of the power receiving apparatus 200 to the power supply apparatus 100 via the second communication unit 205 while the second power is being received from the power supply apparatus 100, and then advances the process to S509.

In S509, the control unit 203 determines whether or not an error has occurred in the power receiving apparatus 200. The "error" in the power receiving apparatus 200 is, for example, an error resulting from an abnormal rise in temperature, in the case where the temperature detected by the temperature detecting unit (not illustrated) of the control unit 203 has exceeded a predetermined temperature. In the case where it is detected that an error has occurred (YES in S509), the control unit 203 advances the process to S512. Meanwhile, in the case where it is not detected that an error has occurred (NO in S509), the control unit 203 advances the process to S510.

In S510, the control unit 203 determines whether or not the charging of the secondary battery 210 is complete. In the case where it has been detected that the secondary battery 210 is completely charged (YES in S510), the control unit 203 advances the process to S511. Meanwhile, in the case where it has been detected that the secondary battery 210 is not completely charged (NO in S510), the control unit 203 returns the process to S509.

In S511, the control unit 203 transmits the dynamic power reception information, including information indicating that the charging is complete, to the power supply apparatus 100 via the second communication unit 205, and ends the process.

In S512, the control unit 203 transmits the dynamic power reception information, including the error information, to the power supply apparatus 100 via the second communication unit 205, and ends the process.

Second Embodiment

A non-contact power supply system according to a second embodiment will be described next.

As described with reference to FIG. 4, in the first embodiment, the power supply apparatus 100 is capable of detecting whether or not the power receiving apparatus 200 is present within the predetermined range 300 of the power supply apparatus 100 through polling carried out by the first communication unit 105. Accordingly, the transmission of the Short Beacon signal in the communication sequence illustrated in FIG. 3 is omitted.

Figure 4:
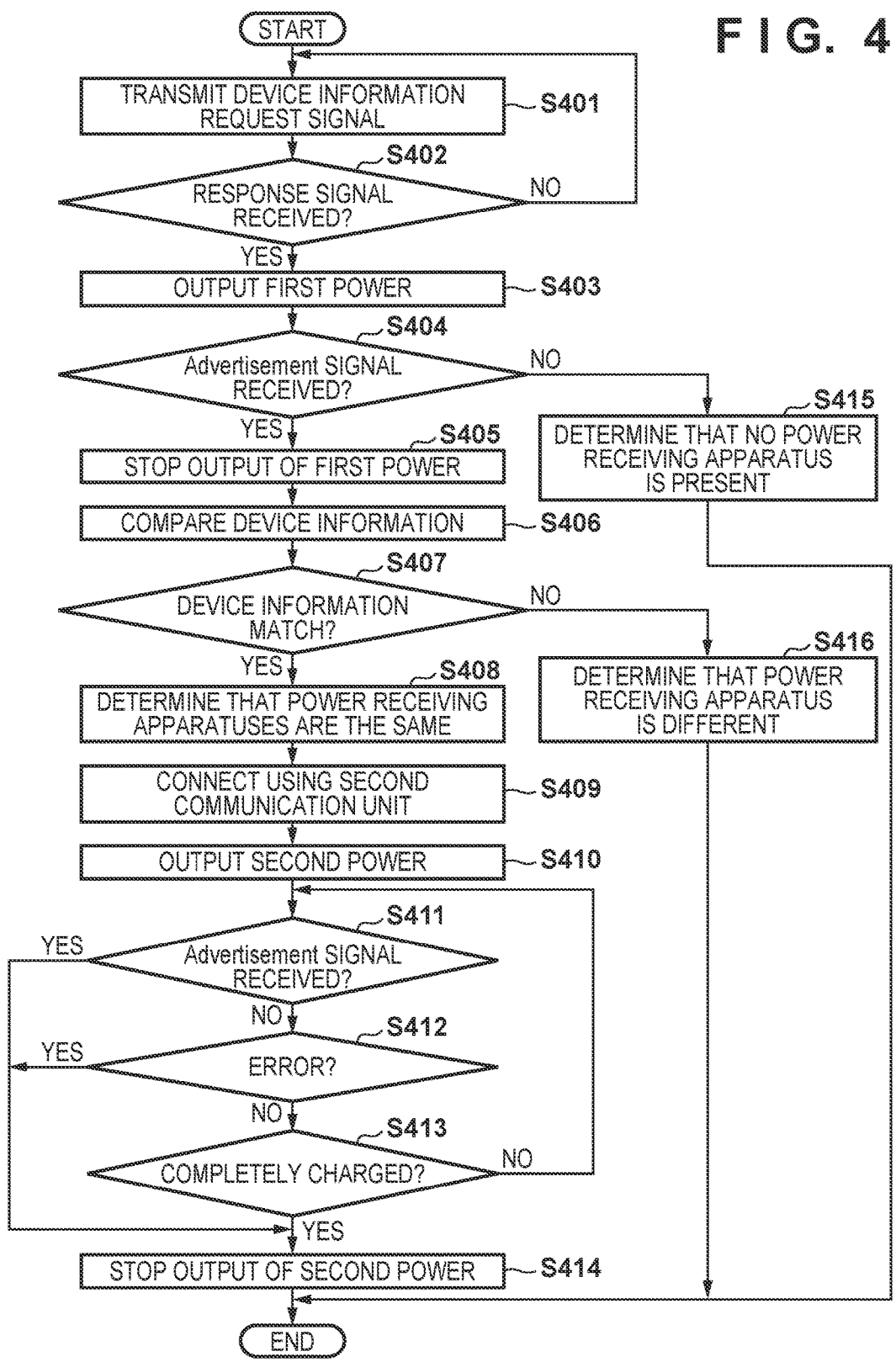
FIG. 4 is a flowchart illustrating a control process carried out by the power supply apparatus according to a first embodiment.

However, in the case where the power receiving apparatus 200 is not compliant with the communication standard used by the first communication unit 105 of the power supply apparatus 100, or does not include the first communication unit 204, the process for supplying power to the power receiving apparatus 200 cannot be carried out using the process illustrated in FIG. 4.

Figure 3:
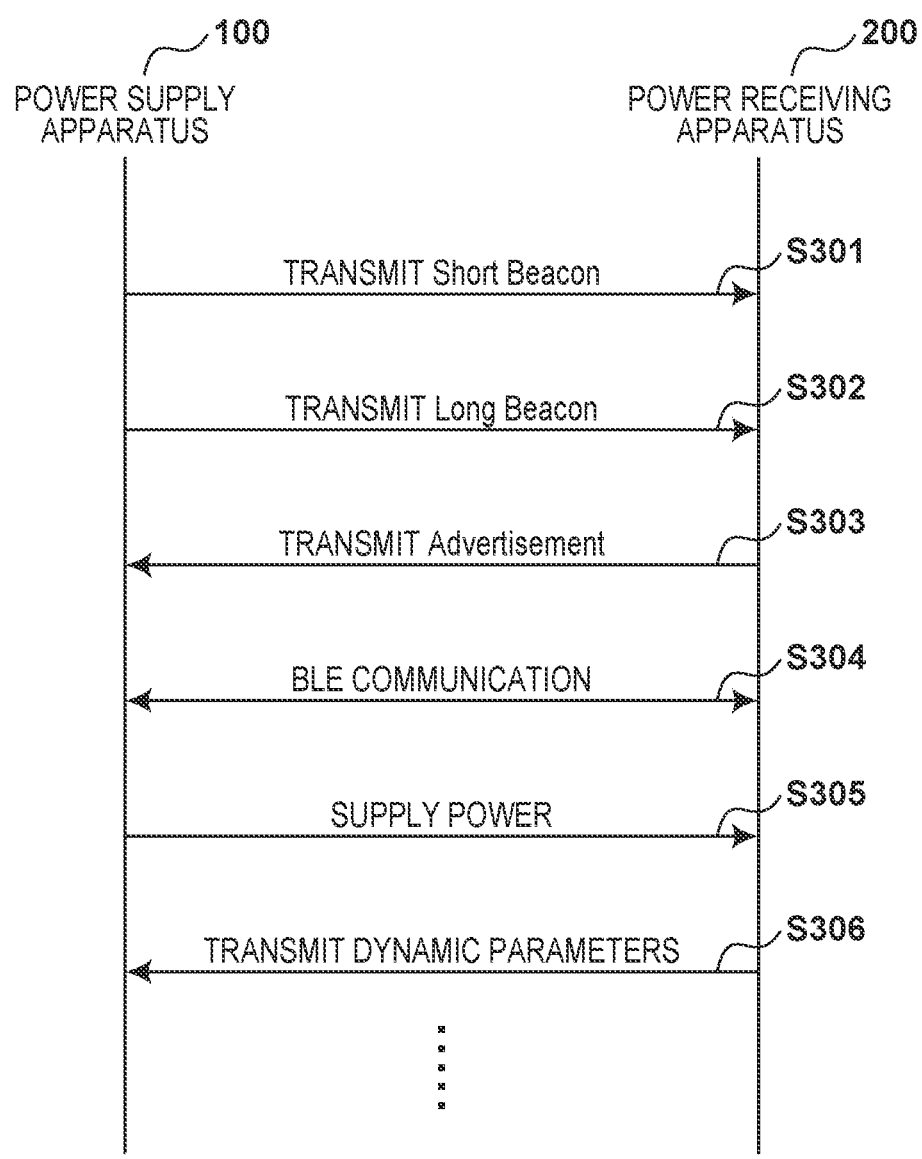
FIG. 3 is a sequence chart illustrating communication that can be applied in the non-contact power supply system according to embodiments of the invention.

Accordingly, in the second embodiment, the first communication unit 105 of the power supply apparatus 100 transmits the Short Beacon signal illustrated in FIG. 3 (that is, outputs the third power) in addition to the process illustrated in FIG. 4. As a result, the process for supplying power to the power receiving apparatus 200 can be carried out even in the case where the power receiving apparatus 200 is not compliant with the communication standard used by the first communication unit 105 of the power supply apparatus 100 or does not include the first communication unit 204.

Aside from the first communication unit 204 of the power receiving apparatus 200 not being compliant with the communication standard used by the first communication unit 105 of the power supply apparatus 100, or the power receiving apparatus 200 not including the first communication unit 204, the configurations of the power supply apparatus 100 and the power receiving apparatus 200 and the communication sequence according to the present embodiment are the same as those of the first embodiment, and thus descriptions thereof will be omitted.

Power Supply Apparatus Operations

A control process through which the power supply apparatus 100 carries out the process for supplying power to a power receiving apparatus 200 not compliant with the communication standard used by the first communication unit 105 will be described next with reference to the flowchart in FIGS. 6A and 6B.

Figure 6A:
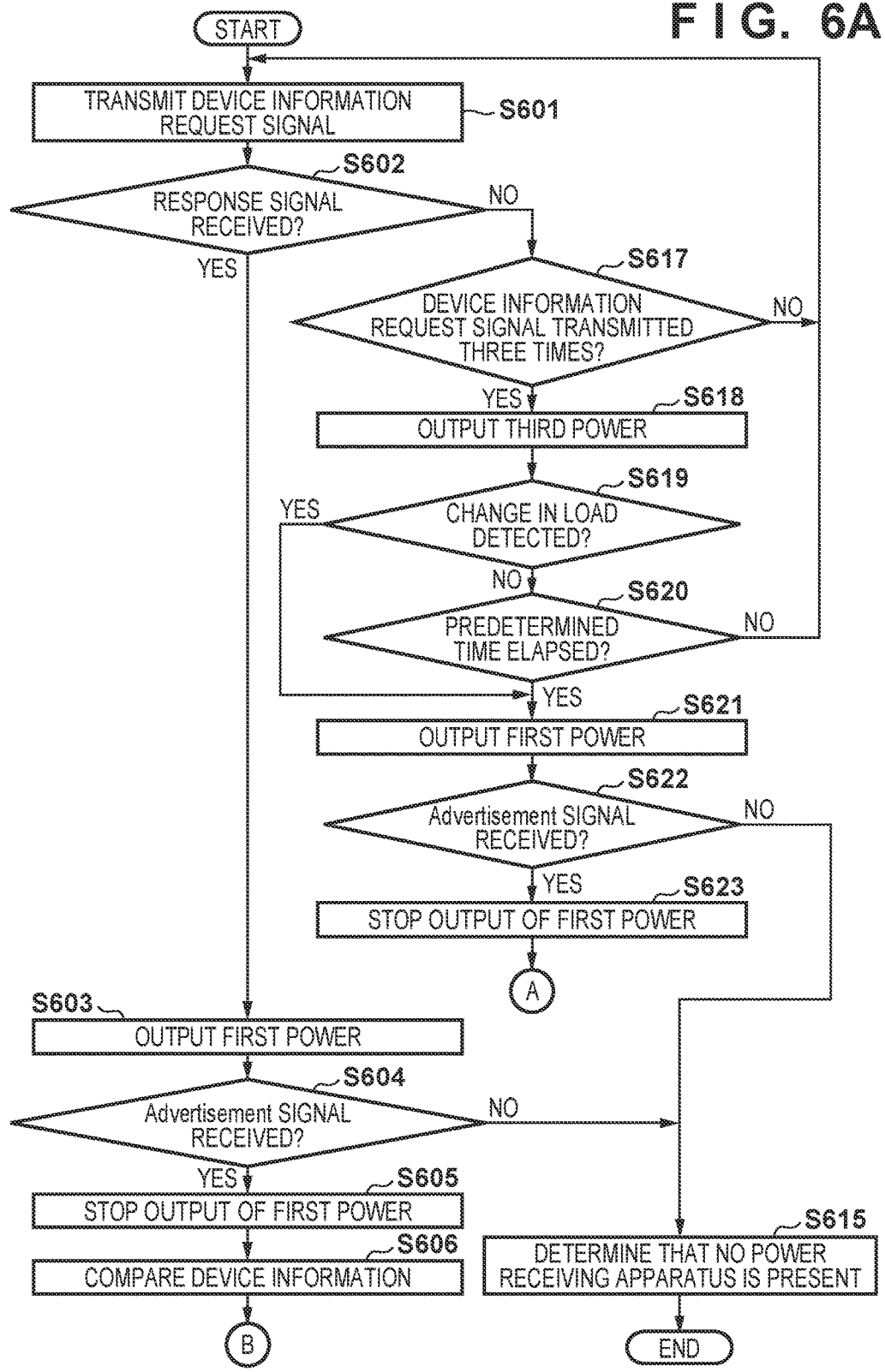
FIGS. 6A and 6B are flowcharts illustrating a control process carried out by the power supply apparatus according to a second embodiment.
Figure 6B:
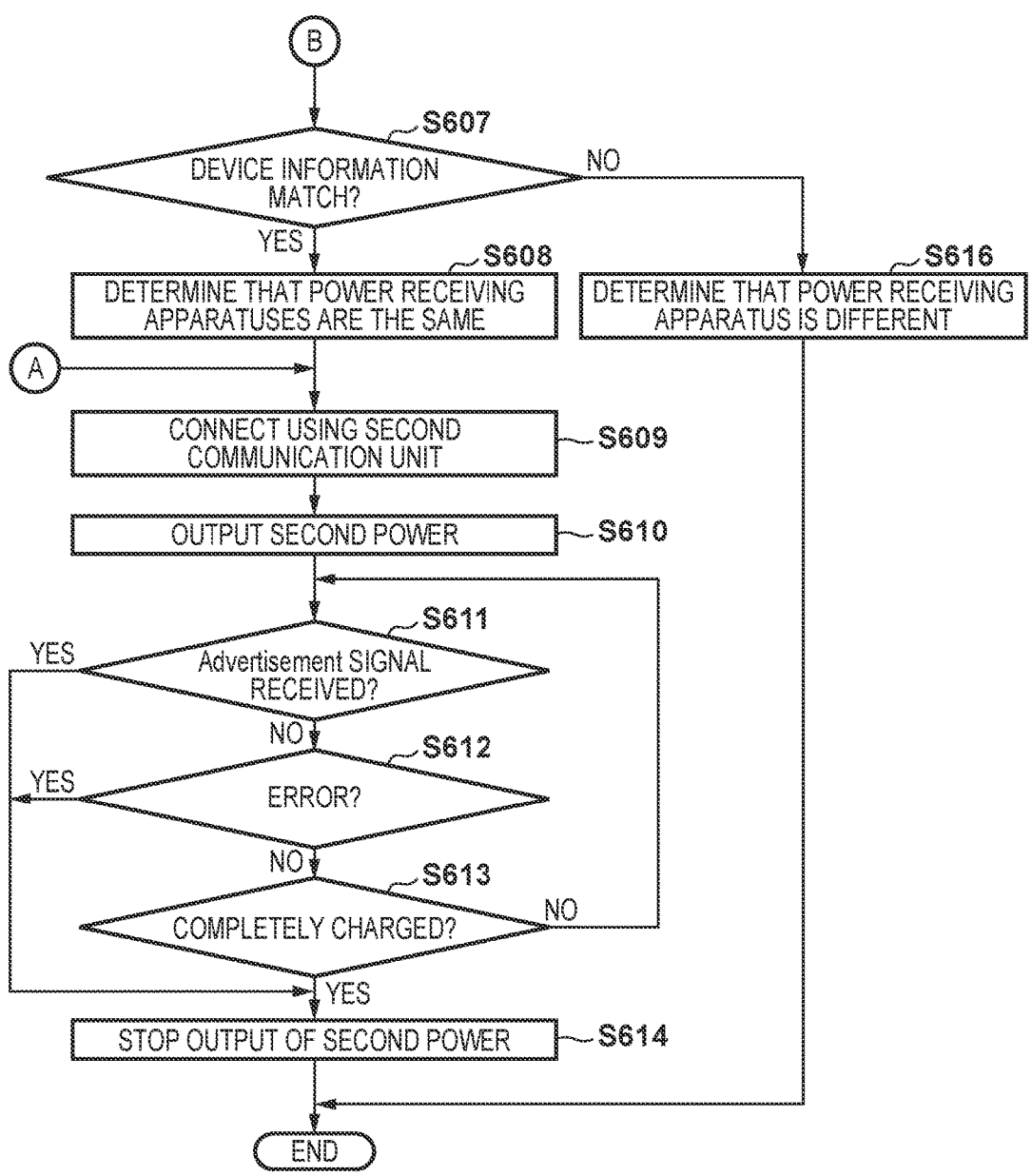

Note that the processes from S601 to S616 and S621 to S623 in FIGS. 6A and 6B are the same as the processes of S401 to S416 and S403 to S405 in FIG. 4, and thus descriptions thereof will be omitted.

In S617, the control unit 102 determines whether or not the device information request signal transmitted via the first communication unit 105 in S601 has been transmitted three times in succession. In the case where the number of successive transmission times of the device information request signal obtained by the timer 111 is three times (YES in S617), the control unit 102 advances the process to S618. Meanwhile, in the case where the number of successive transmission times of the device information request signal obtained by the timer 111 is less than three times (NO in S617), the control unit 102 returns the process to S601. Although the control unit 102 determines whether or not the number of successive transmission times of the device information request signal is three times in this process, the number of successive transmission times of the device information request signal which serves as the determination condition, may be one or more times.

In S618, the control unit 102 controls the power generating unit 101 to output the third power, transmits the Short Beacon signal within the predetermined range 300 of the power supply apparatus 100 via the power supply antenna 104, and advances the process to S619.

In S619, in the case where the power receiving apparatus 200 is present within the predetermined range 300 of the power supply apparatus 100, the impedance of the matching circuit 103 will change, and thus the control unit 102 determines whether or not a change in the impedance of the matching circuit 103 has been detected. In the case where a change in the impedance of the matching circuit 103 has been detected (YES in S619), the control unit 102 advances the process to S621, whereas in the case where a change in the impedance of the matching circuit 103 has not been detected (NO in S619), the control unit 102 advances the process to S620.

In S620, the control unit 102 determines whether or not time information obtained from the timer 111 has reached a predetermined time interval, namely a predetermined time elapses. The predetermined time interval is, for example, a time interval from the transmission of the previous Long Beacon signal to the transmission of the next Long Beacon signal. In the case where the time information obtained from the timer 111 has reached the predetermined time interval (YES in S620), the control unit 102 advances the process to S621. Meanwhile, in the case where the time information obtained from the timer 111 has not reached the predetermined time interval (NO in S620), the control unit 102 returns the process to S601.

Figure 5:
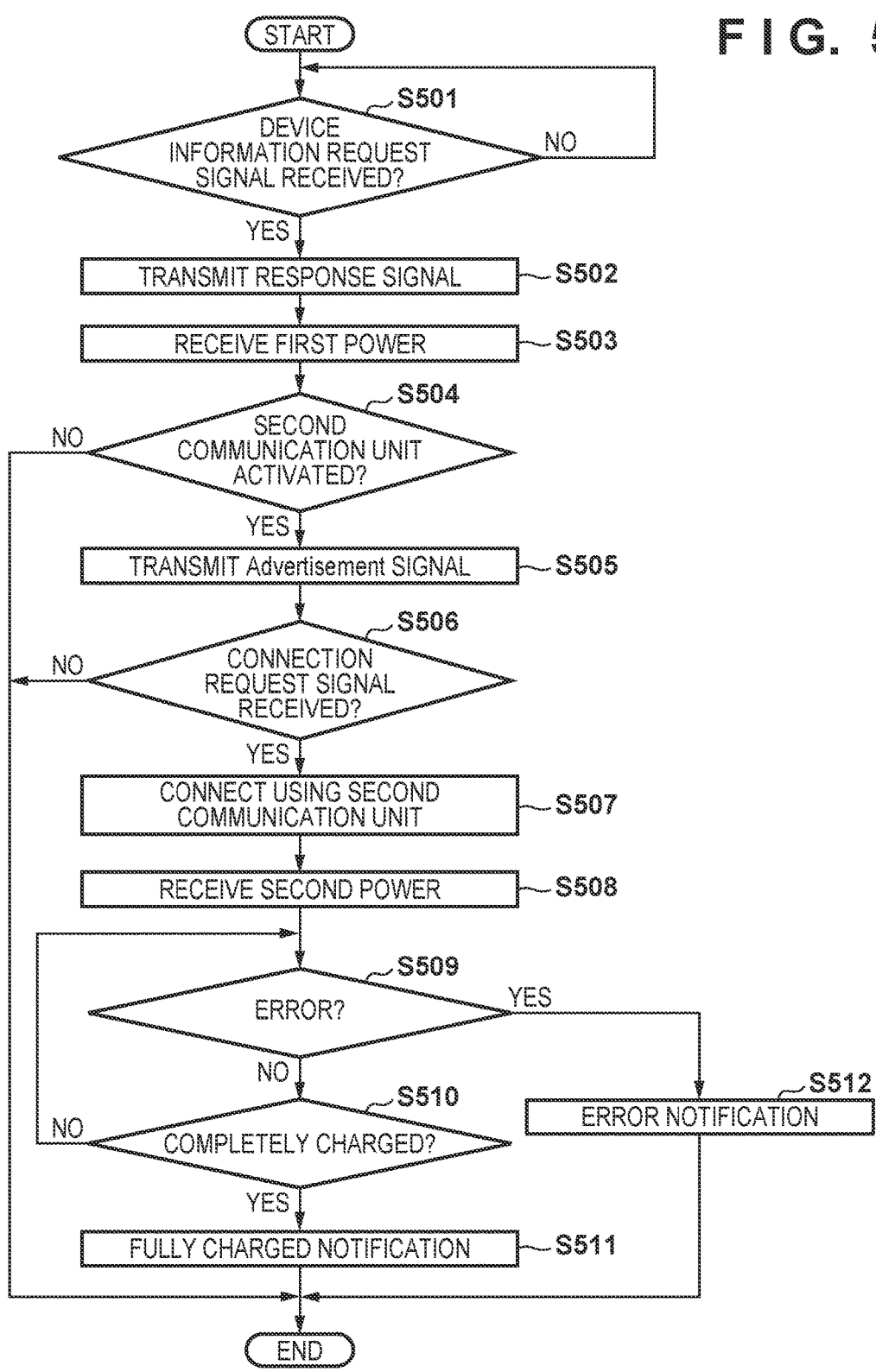
FIG. 5 is a flowchart illustrating a control process carried out by the power receiving apparatus according to the first embodiment.

A control process for the power receiving apparatus 200 in the case where the power receiving apparatus 200 does not include the first communication unit 204 corresponds to the control process for the power receiving apparatus 200 described in FIG. 5, with the processes of S501 and S502, which use the first communication unit 204, being omitted, and the processes from S503 to S512 being executed.

According to the present embodiment, the power supply apparatus 100 can detect that the power receiving apparatus 200 is present within the predetermined range 300 of the power supply apparatus 100 by using the Short Beacon signal illustrated in FIG. 3, even in the case where the power receiving apparatus 200 is not compliant with the communication standard used by the first communication unit 105 of the power supply apparatus 100, or does not include the first communication unit 204. Additionally, the process illustrated in FIG. 4 can be executed in the case where the power receiving apparatus 200 is not compliant with the communication standard used by the first communication unit 105 of the power supply apparatus 100, and thus the power supply apparatus 100 can be prevented from executing a process for supplying power to an unintended power receiving apparatus 200.

Power Receiving Apparatus Operations

A control process for a power receiving apparatus 200 not compliant with the communication standard used by the first communication unit 105 of the power supply apparatus 100, corresponding to the control process for the power supply apparatus 100 illustrated in FIGS. 6A and 6B, will be described next with reference to the flowchart in FIG. 7.

Figure 7:
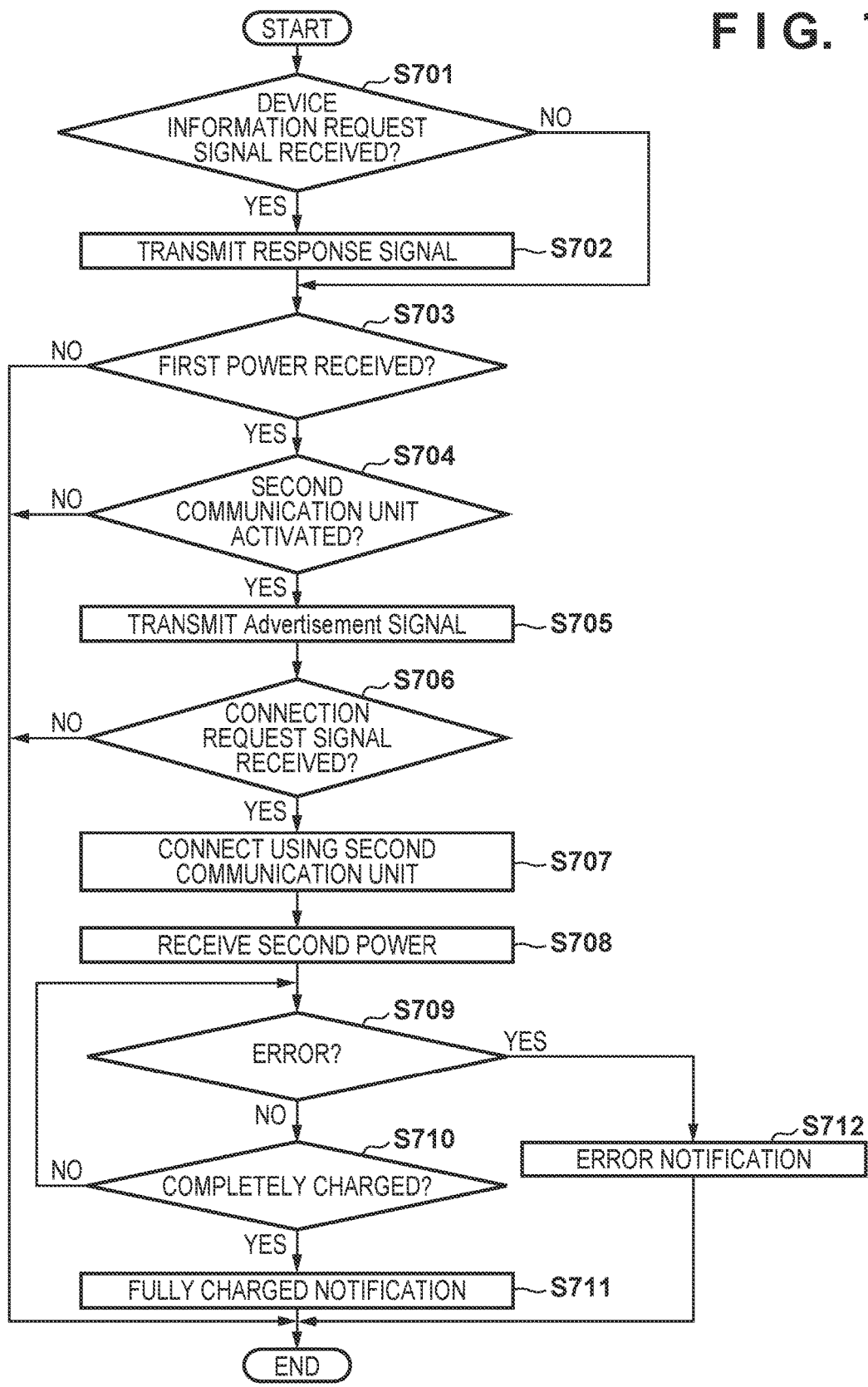
FIG. 7 is a flowchart illustrating a control process carried out by the power receiving apparatus according to the second embodiment.

Note that the processes of S702 and S704 to S712 in FIG. 7 are the same as the processes of S502 and S504 to S512 in FIG. 5, and thus descriptions thereof will be omitted.

In S701, the control unit 203 determines whether or not the device information request signal transmitted from the power supply apparatus 100 has been received via the first communication unit 204. In the case where the device information request signal transmitted from the power supply apparatus 100 has been received via the first communication unit 204 (YES in S701), the control unit 203 advances the process to S702. Meanwhile, in the case where the device information request signal transmitted from the power supply apparatus 100 has not been received via the first communication unit 204 (NO in S701), the control unit 203 advances the process to S703.

The same process as that of S502 is carried out in S702.

In S703, the control unit 203 determines whether or not the Long Beacon signal transmitted from the power supply apparatus 100 has been received via the power receiving antenna 201. In the case where the Long Beacon signal has been received via the power receiving antenna 201 (YES in S703), the control unit 203 advances the process to S704, whereas in the case where the Long Beacon signal has not been received via the power receiving antenna 201 (NO in S703), the control unit 203 ends the process.

The same processes as those of S504 to S512 are carried out in S704 to S712.

According to the present embodiment, a process for supplying power to a power receiving apparatus 200 not compliant with the communication standard used by the first communication unit 105 of the power supply apparatus 100 can be carried out.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-036314, filed Feb. 26, 2016, which is hereby incorporated by reference herein in its entirety.

What is claimed is:

1. A power supply apparatus which can supply power to a power receiving apparatus in a non-contact manner, the power supply apparatus comprising:

a power supply unit configured to output power to the power receiving apparatus in a non-contact manner;

a first communication unit configured to communicate with the power receiving apparatus through a first communication scheme;

a second communication unit configured to communicate with the power receiving apparatus through a second communication scheme, wherein a range in which the second communication unit can communicate is broader than a range in which the first communication unit can communicate; and a control unit configured to transmit a request signal requesting first device information to the power receiving apparatus using the first communication unit, and output first power from the power supply unit after a response signal responding to the request signal is received from the power receiving apparatus;

wherein the control unit receives second device information from the, power receiving apparatus using the second communication unit and compares the second device information and the first device information, wherein, in a case where both of the second device information and the first device information indicate the same power receiving apparatus, the control unit controls the power supply unit to output second power and continue communication with the power receiving apparatus via the second communication unit, wherein, in a case where both of the second device information and the first device information do not indicate the same power receiving apparatus, the control unit controls the power supply unit to stop communication with the power receiving apparatus via the second communication unit.

2. The apparatus according to claim 1, wherein the second power is higher than the first power.

3. The apparatus according to claim 1, wherein the first communication scheme is short-range wireless communication.

4. The apparatus according to claim 1, wherein
the control unit
receives authentication information from the power receiving apparatus using the second communication unit; and
compares the second device information and the first device information included in the authentication information.

5. The apparatus according to claim 1, wherein the control unit outputs the first power or third power using the power supply unit after the request signal has been transmitted to the power receiving apparatus using the first communication unit.

6. The apparatus according to claim 5, wherein
the control unit outputs the first power using the power supply unit in the case where, after the request signal has been transmitted to the power receiving apparatus by the first communication unit, the response signal is received from the power receiving apparatus before a predetermined time elapses; and
outputs the third power using the power supply unit in the case where the response signal has not been received from the power receiving apparatus before the predetermined time elapses.

7. The apparatus according to clan 5, herein time interval in which the request signal is transmitted by the first communication unit is shorter than a time interval in which the power supply unit outputs the third power.

8. The apparatus according to claim 5, wherein the second power is higher than the first power, and the first power is higher than the third power.

9. The apparatus according to claim 1, wherein
the first communication scheme is a communication scheme corresponding to an NFC standard; and
the second communication scheme is a communication scheme corresponding to a Bluetooth standard.

10. A control method of a power supply apparatus which has a power supply unit that outputs power to a power receiving apparatus in a non-contact manner, a first communication unit that communicates with the power receiving apparatus through a first communication scheme, and a second communication unit that communicates with the power receiving apparatus through a second communication scheme, the method comprising:
transmitting a request signal requesting first device information to the power receiving apparatus using the first communication unit;
outputting first power from the power supply unit after a response signal responding to the request signal is received from the power receiving apparatus;
receiving second device information from the power receiving apparatus using the second communication unit; and
comparing the second device information and the first device information;
in a case where both of the second device information and the first device information indicate the same power receiving apparatus, controlling the power supply unit to output second power and continue communication with the power receiving apparatus via the second communication unit,
in a case where both of the second device information and the first device information do not indicate the same power receiving apparatus, stopping communication with the power receiving apparatus via the second communication unit.

11. A non-transitory computer-readable storage medium storing a program for causing a computer to execute a control method of a power supply apparatus which has a power supply unit that outputs power to a power receiving apparatus in a non-contact manner, a first communication unit that communicates with the power receiving apparatus through a first communication scheme, and a second communication unit that communicates with the power receiving apparatus through second communication scheme, the method comprising:
transmitting a request signal requesting first device information to the power receiving apparatus using the first communication unit;
outputting first power from the power supply unit after a response signal responding to the request signal is received from the power receiving apparatus;
receiving second device information from the power receiving apparatus using the second communication unit; and
comparing the second device information and the first device information;
in a case where both of the second device information and the first device information indicate the same power receiving apparatus, controlling the power supply unit to output second power and continue communication with the power receiving apparatus via the second communication unit,
in a case where both of the second device information and the first device information do, not indicate the same power receiving apparatus stopping communication with the power receiving apparatus via the second communication unit.

* * * * *